(No Model.)
P. B. DELANY.
MEANS FOR REGULATING THE VIBRATIONS OF FORKS, REEDS, &c.
No. 322,694. Patented July 21, 1885.
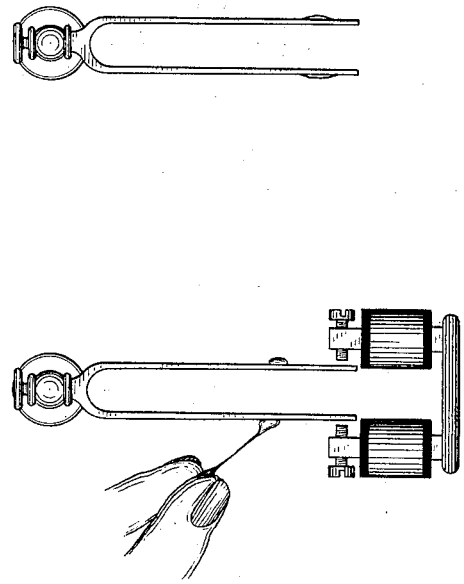
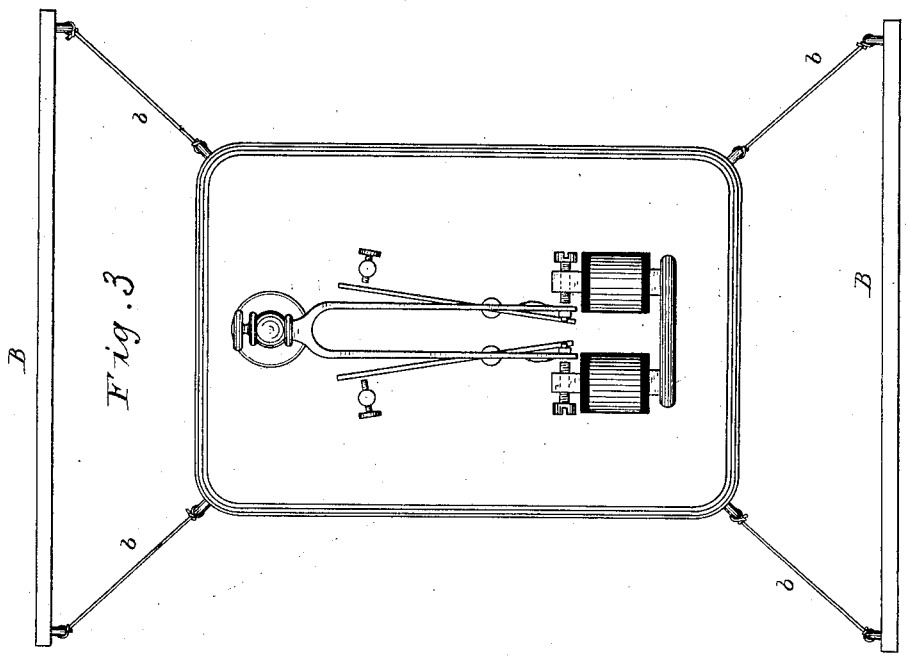
WITNESSES
Ed. A. Newman.
Al. C. Newman.
INVENTOR
Patrick B. Delany
By his Attorneys
Baldwin, Hopkins & Payson

United States Patent Office.

PATRICK B. DELANY, OF NEW YORK, N. Y., ASSIGNOR TO THE STANDARD MULTIPLEX TELEGRAPH COMPANY, OF SAME PLACE.

MEANS FOR REGULATING THE VIBRATIONS OF FORKS, REEDS, &c.

SPECIFICATION forming part of Letters Patent No. 322,694, dated July 21, 1885.

Application filed April 8, 1885. (No model.)

*To all whom it may concern:*

Be it known that I, PATRICK B. DELANY, of New York city, State of New York, have invented certain new and useful Improvements in Means for Regulating the Vibrations of Forks, Reeds, &c., of which the following is a specification.

In many classes of electrical apparatus an accurate and uniform vibration of a tuning fork, reed, or bar is necessary.

The object of my invention is to provide means for accurately adjusting the normal rate of vibration of a fork or reed, and shielding it from any disturbing extraneous influences. Such a fork or reed is especially useful in connection with my synchronous movements or synchronous-telegraphy inventions patented to me October 9, 1883.

Figures 1 and 2 are views illustrating the manner of regulating the normal rate of vibration of the fork, and Fig. 3 is a view illustrating the manner of excluding the effects of extraneous vibration or disturbance.

Heretofore in order to regulate the speed of an electrically-vibrated fork or reed it has been proposed to employ weights sliding on the tines of the fork, by the adjustment of which the rate of vibration of the tines might be changed. Sliding weights are objectionable, however, as it is difficult to adjust them delicately or permanently, because the constant vibration of the fork loosens the fastening of the weight and a secondary vibration is set up in the weights themselves.

In my improved plan I employ some sticky compound or wax—such as Chatterton's compound—or soft sealing-wax, or any adhesive material which may be caused to adhere to the tine of the fork, and, preferably, which will readily soften from moderate heating; or soft metal may be dropped or deposited upon the fork, such, for instance, as lead, solder, or other suitable metal.

In Fig. 1 I have illustrated the employment of wax. A lump may be placed on the tine of the fork and added to or taken away from with great ease and exactness, and without any loosening or variation of the relation between the fork and the wax. The wax may be drawn off in the finest hair-like thread until the exact condition required is obtained. In this figure, E represents the magnet for vibrating the fork. Where lead, solder, or soft metal is used, as illustrated in Fig. 2, it may be scraped or filed away until the exact rate of vibration desired is obtained. In this manner the normal rate of vibration may be adjusted with the greatest nicety.

It is desirable, in order to still further insure a uniform rate of vibration, that the vibrator should be shielded or protected from any extraneous vibrations or disturbances. Vibrating forks or reeds have heretofore usually been placed upon a table or ordinary support. There is a liability under such circumstances that abnormal jars or shocks to the table or floor will affect the vibration of the fork more or less. In order to completely shield the fork or vibrator from such disturbances, I support the base-board of the instrument by rubber bands or other elastic supports, or by non-rigid supports. In Fig. 3 the board is shown as supported by four elastic supports, cords, or bands, *b*, one at each corner. It is obvious, however, that a greater number may be used and that the board may be supported by a sheet of rubber or other flexible or elastic material, or non-rigid material. The character of the elastic supports may be varied—as, for instance, spiral springs may be used. While I prefer to use elastic supports, it is obvious that the desired result would be approximately obtained by any non-rigid supports, such, for instance, as ordinary cord or cloth.

The board may be supported in a vertical position, or the standards or supports B may be arranged above the plane of the table or frame, so that the board may be supported in a horizontal position.

By my manner of regulating the normal rate of vibration with such nicety and then shielding the fork from extraneous disturbances, I obtain a permanent uniform rate of vibration.

I claim as my invention—

1. The combination of a constantly regularly-acting automatic circuit-interrupting vibrator, its support, and flexible or elastic devices for supporting it, whereby a uniform rate and greater amplitude of vibration are obtained.

2. The combination of a vibrator, its base or support, adhesive material applied to the vibrator to regulate its normal rate of vibration, and flexible devices for supporting it.

3. The combination, with a vibrator, of some adhesive material applied thereto to regulate its normal rate of vibration.

In testimony whereof I have hereunto subscribed my name.

PATRICK B. DELANY.

Witnesses:
  WENDELL GOODWIN,
  GEORGE H. WIRTH.